United States Patent
Zhi et al.

(10) Patent No.: US 9,461,741 B2
(45) Date of Patent: Oct. 4, 2016

(54) SIGNAL TRANSMISSION METHOD AND APPARATUS

(71) Applicant: ZTE Corporation, Shenzhen (CN)

(72) Inventors: Zhou Zhi, Shenzhen (CN); Lin Chen, Shenzhen (CN); Chen Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/429,533

(22) PCT Filed: Jul. 8, 2013

(86) PCT No.: PCT/CN2013/078995
§ 371 (c)(1),
(2) Date: Mar. 19, 2015

(87) PCT Pub. No.: WO2013/174307
PCT Pub. Date: Nov. 28, 2013

(65) Prior Publication Data
US 2015/0304028 A1  Oct. 22, 2015

(30) Foreign Application Priority Data

Sep. 20, 2012 (CN) .......................... 2012 1 0351822

(51) Int. Cl.
*H04B 10/116* (2013.01)
*H04B 10/50* (2013.01)
*H04B 3/54* (2006.01)

(52) U.S. Cl.
CPC ............... *H04B 10/116* (2013.01); *H04B 3/54* (2013.01); *H04B 10/502* (2013.01); *H04B 2203/5441* (2013.01); *H04B 2203/5483* (2013.01)

(58) Field of Classification Search
CPC ............ H04B 10/11–10/16; H04B 3/54–3/58; H04B 2203/5483
See application file for complete search history.

(56) References Cited

U.S. PATENT DOCUMENTS

2007/0223930 A1* 9/2007 Ternullo ............... G06F 11/10
398/128
2009/0096592 A1* 4/2009 Wu ........................ H04B 3/542
307/66

(Continued)

FOREIGN PATENT DOCUMENTS

| CN | 101232327 A | 7/2008 |
|---|---|---|
| CN | 102624451 A | 8/2012 |
| CN | 102624455 A | 8/2012 |
| EP | 1858179 A1 | 11/2007 |

OTHER PUBLICATIONS

Komine, T. et al, "Intergrated system of white led visible-light communication and power-line communication", IEEE Transactions on Consumer Electronics, Feb. 2003, vol. 49, No. 1, pp. 71-78, ISSN0098-3063.

(Continued)

*Primary Examiner* — David Payne
*Assistant Examiner* — Casey Kretzer
(74) *Attorney, Agent, or Firm* — Cantor Colburn LLP (57) ABSTRACT

Provided are a signal transmission method and apparatus. In the signal transmission method, a terminal device obtains a signal to be sent; and the terminal device sends the signal through a visible light medium, wherein after being demodulated, the signal sent through the visible light medium is carried on a power line for transmission. By virtue of the solution, the problem in related technologies regarding the integration of the visible light communication as a wireless access manner with the power line communication technology is solved, the construction of the communication network can be more convenient and faster, and the advantages of the visible light communication and the power line communication technology are fully utilized.

15 Claims, 4 Drawing Sheets

(56) References Cited

U.S. PATENT DOCUMENTS

2010/0111538 A1\* 5/2010 Arita .................. H04B 3/54
                                                  398/130
2011/0305460 A1\* 12/2011 Snyder ............... H04B 10/43
                                                  398/140
2012/0001567 A1\* 1/2012 Knapp ............... H04L 12/282
                                                  315/291

OTHER PUBLICATIONS

International Search Report for corresponding application PCT/CN2013/078995 filed Jul. 8, 2013; Mail date Oct. 17, 2013.
European Search Report for corresponding application EP 13 79 3457: Report dated May 10, 2016.

\* cited by examiner

SIGNAL TRANSMISSION METHOD AND APPARATUS

TECHNICAL FIELD

The disclosure relates to the field of communications, in particular to a signal transmission method and apparatus.

BACKGROUND

High-speed power line communication is a communication mode which takes a power line as a communication medium. The power line is never an ideal communication medium, but with the continuous improvement of technology, especially the development of modulation technique and microelectronic technique, the practicability of power line communication (PLC) has become possible. The earliest practical technique of high-speed power line communication is a communication system called "pulse control". The system provides one-way communication with an extremely low speed, with a transmitter power being several kilowatts and is mainly used for street lamps and load control. Since 1950, people have started to study the high frequency characteristics (5 kHz~500 kHz) of a power line (mainly high-voltage) channel, and have developed power system dispatching communication and power line carrier based on the high frequency characteristics. Since 1990, the high frequency characteristics (2 MHz~80 MHz) of a power line (mainly low-voltage and mid-voltage) channel have been studied abroad, and practical high-speed PLC products and systems have been developed based thereon. Updated power line communication system can realize higher data transmission speed over channels with different band widths of the same power line via techniques such as orthogonal frequency division multiplexing (OFDM). Many high-speed PLC products and systems are widely used in various aspects, such as home networking, high-speed Internet access, smart home, at present.

Visible light communication (VLC) is a wireless communication technique, which realizes information transmission using visible light with a wavelength between 400 THz (780 nm; 1 THz=1000 GHz) to 800 THz (375 nm) as a communication medium. The transmission capability is 10 kbit/s when ordinary daylight lamp is used. The transmission capability can reach more than 500 Mbit/s when a light emitting diode (LED for short) is used. The transmission distance can reach 1-2 kilometer. The most distinctive feature of the VLC is that the VLC can be combined with the technique of solid state lighting, and data transmission with visible light as a medium can be realized with a lighting device. Many research institutions around the world are now dedicated in realizing higher communication speed of visible light communication.

LED lighting technique based visible light communication in combination with high-speed power line carrier communication technique can conveniently and rapidly construct a high-speed communication network and take the advantage of visible light communication and power line communication technique, by using visible light communication as a wireless access mode and using power line carrier communication as a signal return mode. However, how to integrate visible light communication as a wireless access mode with power line communication technique is not mentioned in relevant technique.

No effective solution have been proposed for the problem of how to integrate visible light communication as a wireless access mode with power line communication technique is not mentioned in relevant technique.

SUMMARY

A signal transmission method and device are provided in the embodiments of the disclosure, so as to solve the problem of how to integrate visible light communication as a wireless access mode with power line communication technique is not mentioned in relevant technique.

According to an embodiment of the disclosure, a signal transmission method is provided, and the method includes: a terminal device obtaining a signal to be sent; and the terminal device sending the signal through a visible light medium, wherein after being demodulated, the signal sent through the visible light medium is carried on a power line for transmission.

In an example embodiment, sending the signal, by the terminal device, through a visible light medium includes: sending, by the terminal device, the signal via an LED light source.

In an example embodiment, sending the signal, by the terminal device, through the LED light source includes: sending, by the terminal device, the signal via the LED light source on a camera.

In an example embodiment, after sending, by the terminal device, the signal through the visible light medium the method further includes: receiving the signal via a light receiving device, and demodulating the signal; and carrying the demodulated signal on a power line carrier for transmission via a coupling transmission device.

In an example embodiment, demodulating the signal includes: filtering the signal received by the light receiving device, demodulating the filtered signal, decoding the demodulated signal and sending the decoded signal to a first processor, wherein the first processor is configured to convert the signal from a digital signal to an analogue signal.

In an example embodiment, carrying the demodulated signal on the power line carrier for transmission via the coupling transmission device includes: processing the signal via a first analogue front end, and then carrying the demodulated signal on the power line carrier for transmission via the coupling transmission device, wherein the first analogue front end includes a filter and an amplifier.

In an example embodiment, after carrying the demodulated signal on the power line carrier for transmission via the coupling transmission device the method further includes: sending the signal to an Internet via an access gateway.

In an example embodiment, sending the signal to the Internet via the access gateway includes: sending the signal which is carried on the power line carrier to a second processor via a second analogue front end, and storing the signal in the second processor and sending the signal to the Internet via the access gateway, wherein the second processor is configured to convert the signal from an analogue signal to a digital signal, and the second analogue front end includes a filter and an amplifier.

In an example embodiment, sending the signal to the Internet via the access gateway includes at least one of the following modes: a wired mode and a wireless mode.

In an example embodiment, the terminal device includes at least one of the following: a cellphone, a tablet computer, a notebook computer, and a fixed terminal with a camera.

According to another embodiment of the disclosure, a signal transmission apparatus is further provided, including: an acquisition component, configured to acquire a signal to be sent; and a sending component, configured to send the signal through a visible light medium, wherein after being demodulated, the signal sent through the visible light medium is carried on a power line for transmission.

In an example embodiment, the sending component includes: a sending unit, configured to send the signal through a light-emitting diode (LED) light source on a camera.

According to another embodiment of the disclosure, a signal transmission system is also provided, including the signal transmission apparatus mentioned above, further including: a processing component, configured to receive the signal via a light receiving device, and demodulate the signal; and a carrying component, configured to carry the demodulated signal on a power line carrier for transmission via a coupling transmission device.

With the embodiments of the disclosure, a terminal device acquires a signal to be sent; and the terminal device sends the signal through a visible light medium, wherein after being demodulated, the signal sent through the visible light medium is carried on a power line for transmission. With the above-mentioned solution, the problem in related technologies regarding the integration of the visible light communication as a wireless access manner with the power line communication technology is solved, the construction of the communication network can be more convenient and faster, and the advantages of the visible light communication and the power line communication technology are fully utilized.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF THE EMBODIMENTS

The disclosure is described below with reference to the accompanying drawings and embodiments in detail. Note that, the embodiments of the disclosure and the features of the embodiments can be combined with each other if there is no conflict.

Figure 1:
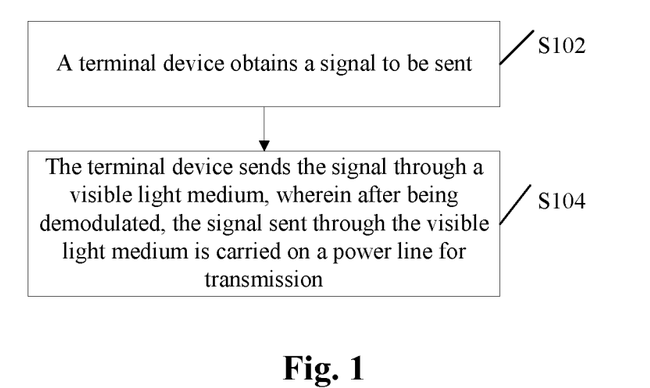
FIG. 1 shows a flowchart of a signal transmission method according to an embodiment of the disclosure.

A signal transmission method is provided in this embodiment. FIG. 1 is a flowchart of a signal transmission method according to an embodiment of the disclosure. As shown in FIG. 1, the method includes steps S102 and S104.

In step S102, a terminal device acquires a signal to be sent.

In step S104, the terminal device sends the signal through a visible light medium, wherein after being demodulated, the signal sent through the visible light medium is carried on a power line for transmission.

In this embodiment, by means of the mentioned steps, the terminal device sends a signal to be sent through a visible light medium, and after being demodulated, the signal is carried on a power line for transmission, so that integration of the power line communication technique with visible light communication as a wireless access mode is realized. The problem in related technologies regarding the integration of the visible light communication as a wireless access manner with the power line communication technology is solved, the construction of the communication network can be more convenient and faster, and the advantages of the visible light communication and the power line communication technology are fully utilized.

In an example embodiment, the terminal device may send the signal to be sent via an LED light source. The LED light source has a stronger transmission capability and a farther transmission distance, thus having a better communication effect.

In an example embodiment, for a current terminal device, the signal may be sent via an LED light source (for example, a flashlight) on a camera of the terminal device. Since all the current terminal devices have a camera thereon, and the camera often has an LED flashlight thereon, this method is easy to implement and has good practicability.

As an example implementation, after the terminal device sends a signal via a visible light medium, a light receiving device coupled to the power line may also receive a signal and demodulate the signal; and then the demodulated signal is carried on a power line carrier via a coupling transmitting device for transmission.

In an example embodiment, the method for demodulating the signal may be implemented in the following manner: the signal received by the light receiving device is filtered and then demodulated, and the demodulated signal is decoded and then sent to a first processor, wherein the first processor is configured to convert the signal from a digital signal to a analogue signal.

In an example embodiment, carrying the demodulated signal on the power line carrier via a coupling transmission device may be implemented in the following manner: the demodulated signal is processed via a first analogue front end, and then the demodulated signal is carried on a power line carrier for transmission via a coupling transmission device, wherein the first analogue front end includes a filter and an amplifier.

In an example embodiment, after the demodulated signal is carried on a power line carrier for transmission via a coupling transmission device, the signal may be sent to an Internet via an access gateway. For example, the signal which is carried on the power line carrier may be sent to a second processor via a second analogue front end, and the signal is stored in the second processor and sent to the Internet via the access gateway, wherein the second processor is configured to convert the signal from an analogue signal to a digital signal, and the second analogue front end includes a filter and an amplifier.

In an example embodiment, sending the signal to an Internet via an access gateway may be implemented via a wired mode and/or a wireless mode.

In an example embodiment, the above-mentioned terminal device may be a cellphone, a tablet computer, a notebook computer, a fixed terminal with a camera and the like.

Corresponding to the method, a signal transmission apparatus, located in the terminal device, is also provided in this embodiment. The apparatus is used for realizing the above-mentioned embodiments and example implementation, which is already explained and will not be described any more. As used hereinbelow, the term "component" can realize the combination of software and/or hardware with a predetermined function. Although the apparatus described in the embodiments below is preferably implemented with software, implementation with hardware, or a combination of software and hardware can also be conceived.

Figure 2:
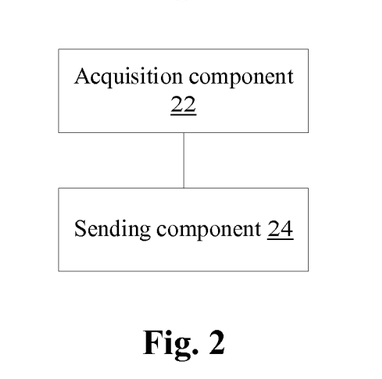
FIG. 2 shows a structural diagram of a signal transmission apparatus according to an embodiment of the disclosure.

FIG. 2 shows a structural diagram of a signal transmission apparatus according to an embodiment of the disclosure. As shown in FIG. 2, the apparatus includes: an acquisition component 22 and a sending component 24, and the components are described in detail below.

The acquisition component 22 is configured to acquire a signal to be sent. The sending component 24, coupled to the acquisition component 22, is configured to send through a visible light medium the signal acquired by the acquisition component 22, wherein after being demodulated, the signal sent through the visible light medium is carried on a power line for transmission.

In this embodiment, by means of the mentioned components, the terminal device sends a signal to be sent acquired by the acquisition component 22, through a visible light medium using the sending component 24, and after being demodulated, the signal is carried on a power line for transmission, so that the integration of the power line communication technique with visible light communication as a wireless access mode is realized. The problem in related technologies regarding the integration of the visible light communication as a wireless access manner with the power line communication technology is solved, the construction of the communication network can be more convenient and faster, and the advantages of the visible light communication and the power line communication technology are fully utilized.

In an example embodiment, the sending component 24 may include: a sending unit, configured to send the signal through a light-emitting diode (LED) light source on a camera.

Figure 3:
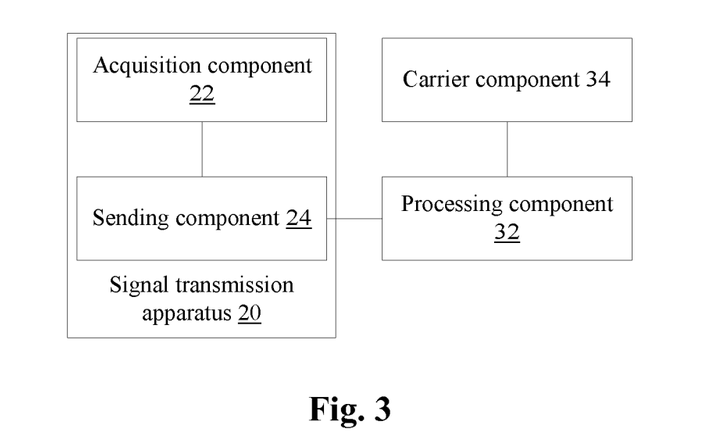
FIG. 3 shows a structural diagram of a signal transmission system according to an embodiment of the disclosure.

A signal transmission system is also provided in an embodiment. FIG. 3 shows a structural diagram of a signal transmission system according to an embodiment of the disclosure. As shown in FIG. 3, the system includes a signal transmission apparatus 20 as shown in FIG. 2, and further includes: a processing component 32, coupled to the sending component 24, configured to receive the signal via a light receiving device, and demodulate the signal; and a carrying component 34, coupled to the processing component 32, configured to carry the demodulated signal on a power line carrier for transmission via a coupling transmission device.

Description is made below in combination an example embodiment, the example embodiment below is combined with the above-mentioned embodiments and example implementation thereof.

In the example embodiment below, an architecture which integrates power line communication and visible light communication is provided. The architecture combines the power line carrier technique and visible light communication technique, realizes not only rapid and convenient networking but also the access to the Internet and the control of household appliance with widely distributed power lines and visible light as a medium.

The visible light communication technique, combined with the power line carrier communication technique, can provide a convenient, rapid and more price-advantage networking mode for a home network and an office network.

Figure 4:
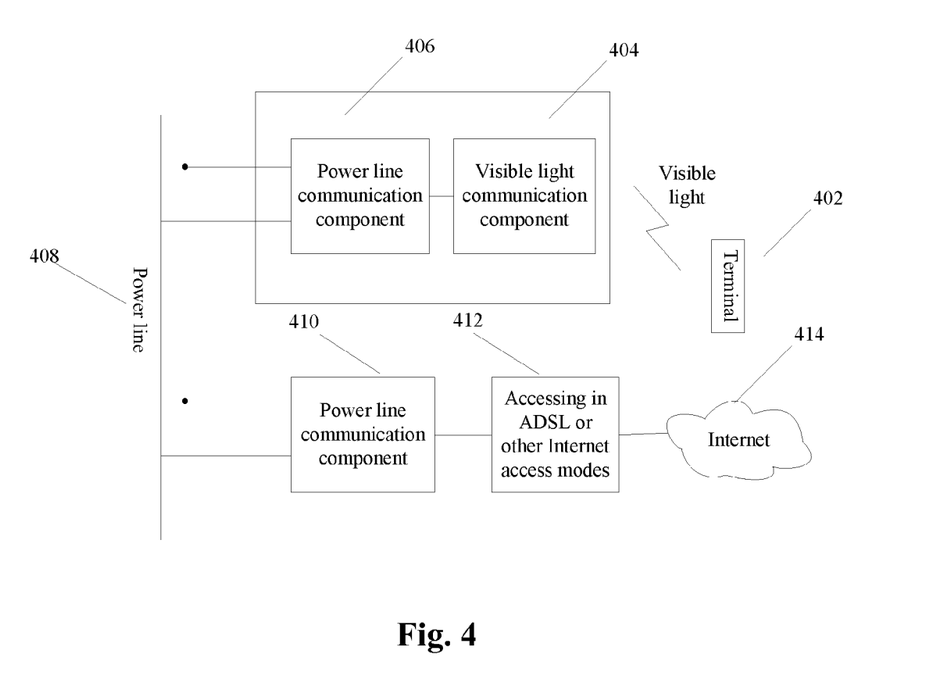
FIG. 4 is a structural diagram showing an architecture containing both power line communication and visible light communication according to an example embodiment of the disclosure.

FIG. 4 is a structural diagram showing an architecture containing both power line communication and visible light communication according to an example embodiment of the disclosure. As shown in FIG. 4, the processing components in the architecture include:

402, a terminal;
404, a visible light communication component (which implements the function of the processing component 32);
406, a power line communication component (which implements the function of the bearing component 34);
408, a power line;
410, a power line communication component;
412, an ADSL and other Internet access gateway;
414, the Internet.

Based on the above-mentioned architecture, the flow of the terminal sending a signal may be as follows.

For an uplink signal, the terminal sends the signal to the visible light communication component 404 via a visible light medium; the visible light communication component 404 then demodulates the signal and sends the signal to the power line communication component 406 for processing; the signal is transmitted over the power line 408 and processed by the power line communication component 410, and is accessed to the Internet 414 via the ADSL or other Internet access device 412.

For a downlink signal, the digital signal of the Internet 414 enters the power line communication component 410 via the ADSL or other access devices, and enters the power line for transmission via the power line conversion component.

Figure 5:
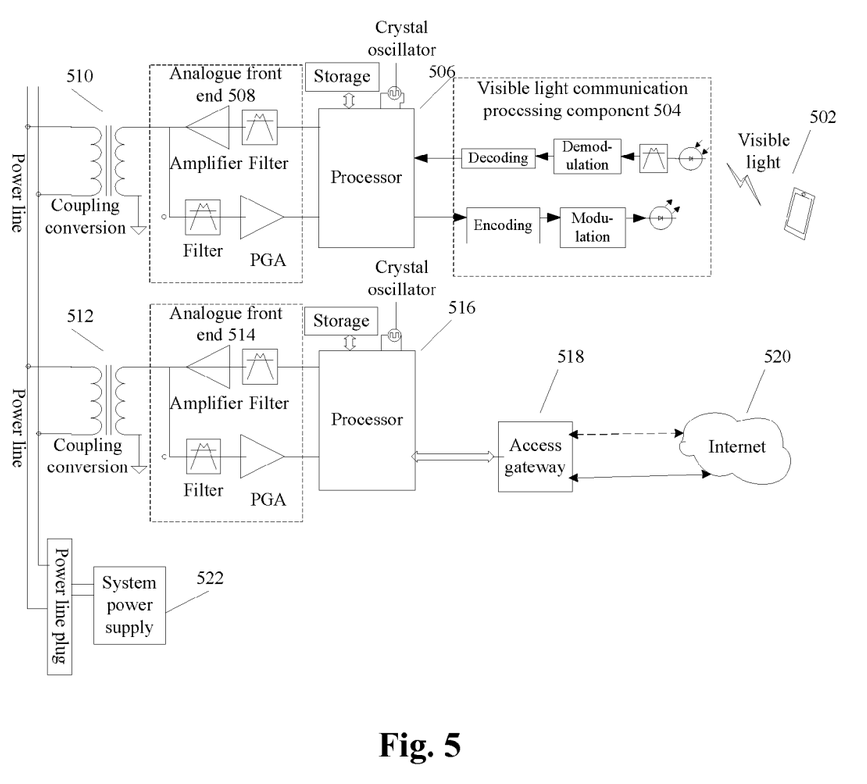
FIG. 5 is a schematic diagram of an information processing component which integrates power line carrier and visible light communication according to an example embodiment of the disclosure.

FIG. 5 is a schematic diagram of an information processing component which integrates power line carrier and visible light communication according to an example embodiment of the disclosure. As shown in FIG. 5, in an example embodiment, the following processing units are included.

502, a terminal device;
504, a visible light communication processing unit, including a light receiver, a filtering, demodulation, decoding/coding, modulation and transmission device;
506, a processor, which processes, stores and performs data conversion on the received information;
508, analogue front end: including a filter, an amplifier, and a programmable gain amplifier;
510, coupling conversion unit;
512, coupling conversion unit;
514, analogue front end: responsible for the conversion of a power line carrier signal;
516, processor;
518, access gateway: including accessing the Internet in a wired or wireless mode;
520, the Internet; and
522, system power supply, available direct current power is acquired by the power line for use of communication components, such as the processor and amplifier.

Based on the information processing component mentioned above, the information processing flow of the terminal may be as follows.

I. Uplink Signal Processing Flow of the Terminal:
the terminal 502 sends a visible light signal via a visible light device;

the visible light processing component 504 receives the visible signal via the light receiving device, and sends the data into the processor unit after the filtering, demodulation and decoding process;

the processor unit 506 processes the data, which then goes through the amplifier;

after being delivered by the coupling conversion unit 510, the signal enters the power line carrier for delivery;

the coupling conversion unit 512 receives the signal on the power line carrier, the signal is processed by the analogue front end 514 and is converted into a digital signal by the processor and then stored, then goes through the access gateway 518 and accesses the Internet in a wired or wireless mode.

II. Downlink Signal Processing Flow of the Terminal:

the signal of the Internet 520 is accessed to the access gateway 518 in a wired or wireless mode, and is sent to the processor 516 for processing, and the modulated signal is filtered and amplified by the analogue front end 514 and then subjected to the coupling conversion of the coupling conversion unit 512;

after the coupling conversion of 512, the signal is processed by the filter and the programmable gain amplifier in the analogue front end 508, and the digital signal is stored in the processor and then transmitted to the terminal device 502 via the visible light transmission unit 504.

Embodiment 1

Figure 6:
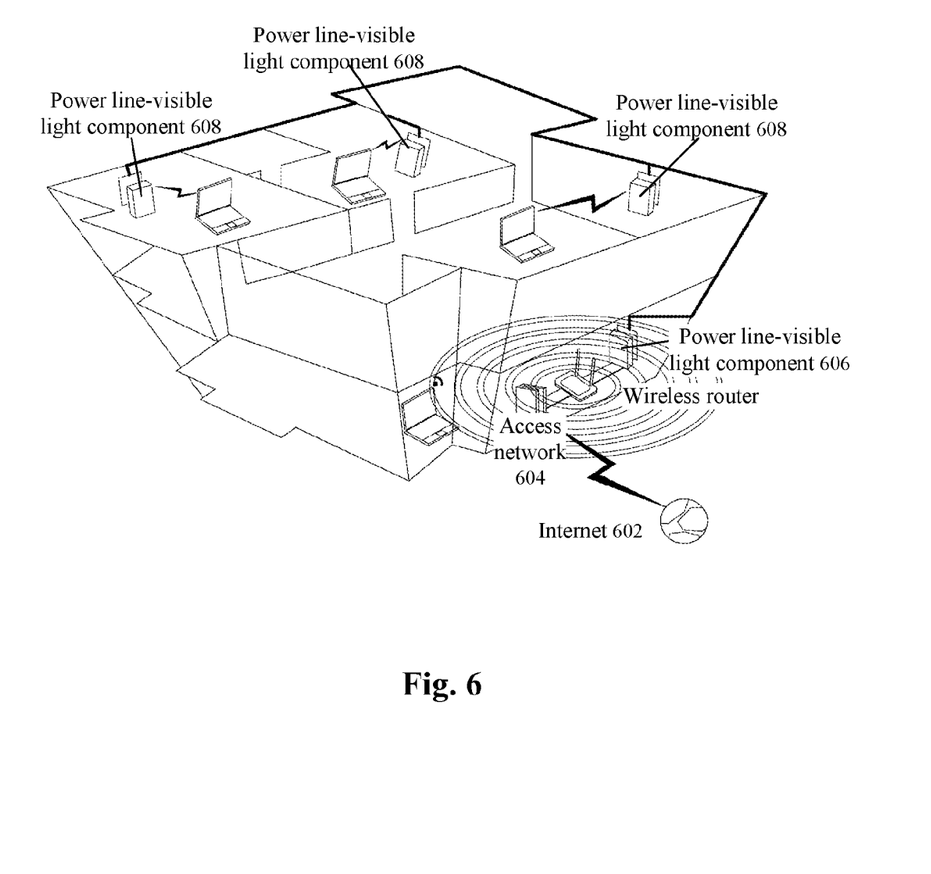
FIG. 6 is a schematic diagram which combines power line communication and visible light communication according to embodiment 1 of the disclosure.

A solution of a wireless terminal accessing an external network by means of power line communication in combination with visible light communication is provided in this example embodiment. FIG. 6 is a schematic diagram which combines power line communication and visible light communication according to embodiment 1 of the disclosure. As shown in FIG. 6, this architecture includes communication units as follows:

the Internet 602; an Internet access gateway 604; a power line-visible light communication component 606, being able to receive a visible light signal and convert the visible light signal into a power line carrier signal; and power line-visible light communication components 608 located in other rooms.

The implementation and processing process of the solution is described as follows.

A power line-visible light communication components 608 located in another room receives a visible light signal sent by a terminal device (for example, communication devices, such as cellphone, tablet computer, notebook computer) via an LED flashlight of the camera;

the power line carrier signal is transmitted via the power line;

the power line carrier signal is received by the power line-visible light component 606 and is connected to a wireless router via a wired or wireless interface of the power line-visible light component 606, and is accessed to the Internet 602 via the Internet gateway device 604 (for example, access devices such as asymmetric digital subscriber line (ADSL)).

Embodiment 2

A solution of controlling room appliances via power line-visible light communication is provided in this example embodiment. The household appliances, including water heater, security and protection, lamplight, gas monitoring and the like, can be controlled via visible light communication. The steps of the solution are as follows:

a terminal sends a signal for controlling an appliance;

the power line-visible light component receives, demodulates and decodes the signal;

a corresponding target device is found, the target device controls its action, which herein may include water heater opening time, lamplight brightness adjustment, gas monitoring, security and protection, in responsive to the signal of the terminal.

In another embodiment, software is provided, the software is used for carrying out the technical solution described in the embodiment mentioned above and the example embodiment.

In another embodiment, a storage medium is also provided. The software is stored on the storage medium, and the storage medium includes but is not limited to optical disks, floppy disks, hard disks, erasable storages, etc.

Obviously, those skilled in the art should know that each of the mentioned components or steps of the disclosure can be realized by universal computing devices; the components or steps can be focused on single computing device, or distributed on the network formed by multiple computing devices; selectively, they can be realized by the program codes which can be executed by the computing device; thereby, the components or steps can be stored in the storage device and executed by the computing device; and under some circumstances, the shown or described steps can be executed in different orders, or can be independently manufactured as each integrated circuit component, or multiple components or steps thereof can be manufactured to be single integrated circuit component, thus to be realized. In this way, the disclosure is not restricted to any particular hardware and software combination.

The descriptions above are only the preferable embodiment of the disclosure, which are not used to restrict the disclosure, for those skilled in the art, the disclosure may have various changes and variations. Any amendments, equivalent substitutions, improvements, etc. within the principle of the disclosure are all included in the scope of the protection defined by the appended claims of the disclosure.

What is claimed is:

1. A signal transmission method, comprising:

acquiring, by a terminal device, a signal to be sent; and sending, by the terminal device, the signal through a visible light medium, wherein after being demodulated, the signal sent through the visible light medium is carried on a power line for transmission;

wherein after sending, by the terminal device, the signal through the visible light medium, the method further comprises:

receiving the signal via a light receiving device, and demodulating the signal; and carrying the demodulated signal on a power line carrier for transmission via a coupling transmission device;

wherein after carrying the demodulated signal on the power line carrier for transmission via the coupling transmission device, the method further comprises:

sending the signal to an Internet via an access gateway;

wherein sending the signal to the Internet via the access gateway comprises:

sending the signal which is carried on the power line carrier to a second processor via a second analogue front end, and storing the signal in the second processor and sending the signal to the Internet via the access gateway, wherein the second processor is configured to convert the signal from an analogue signal to a digital signal, and the second analogue front end comprises a filter and an amplifier.

2. The method according to claim 1, wherein sending, by the terminal device, the signal through the visible light medium comprises:
sending, by the terminal device, the signal through a light-emitting diode (LED) light source.

3. The method according to claim 2, wherein sending, by the terminal device, the signal through the LED light source comprises:
sending, by the terminal device, the signal through the LED light source on a camera.

4. The method according to claim 2, wherein after sending, by the terminal device, the signal through the visible light medium, the method further comprises:
receiving the signal via a light receiving device, and demodulating the signal; and
carrying the demodulated signal on a power line carrier for transmission via a coupling transmission device.

5. The method according to claim 1, wherein demodulating the signal comprises:
filtering the signal received by the light receiving device, demodulating the filtered signal, decoding the demodulated signal and sending the decoded signal to a first processor, wherein the first processor is configured to convert the signal from a digital signal to an analogue signal.

6. The method according to claim 5, wherein after carrying the demodulated signal on the power line carrier for transmission via the coupling transmission device, the method further comprises:
sending the signal to an Internet via an access gateway.

7. The method according to claim 1, wherein carrying the demodulated signal on the power line carrier for transmission via the coupling transmission device comprises:
processing the demodulated signal via a first analogue front end, and then carrying the demodulated signal on the power line carrier for transmission via the coupling transmission device, wherein the first analogue front end comprises a filter and an amplifier.

8. The method according to claim 7, wherein after carrying the demodulated signal on the power line carrier for transmission via the coupling transmission device, the method further comprises:
sending the signal to an Internet via an access gateway.

9. The method according to claim 1, wherein sending the signal to the Internet via the access gateway comprises at least one of the following modes: a wired mode and a wireless mode.

10. The method according to claim 1, wherein the terminal device comprises at least one of the following: a cellphone, a tablet computer, a notebook computer, and a fixed terminal with a camera.

11. The method according to claim 1, wherein sending the signal to the Internet via the access gateway comprises at least one of the following modes: a wired mode and a wireless mode.

12. A signal transmission apparatus, located in a terminal device, wherein the signal transmission apparatus comprises:
an acquisition component, configured to acquire a signal to be sent; and
a sending component, configured to send the signal through a visible light medium, wherein after being demodulated, the signal sent through the visible light medium is carried on a power line for transmission;
wherein the signal transmission apparatus is further configured to receive the signal via a light receiving device, and demodulate the signal; and carry the demodulated signal on a power line carrier for transmission via a coupling transmission device;
wherein the signal transmission apparatus is further configured to send the signal to an Internet via an access gateway;
wherein the signal transmission apparatus is further configured to send the signal which is carried on the power line carrier to a second processor via a second analogue front end, and storing the signal in the second processor and sending the signal to the Internet via the access gateway, wherein the second processor is configured to convert the signal from an analogue signal to a digital signal, and the second analogue front end comprises a filter and an amplifier.

13. The apparatus according to claim 12, wherein the sending component comprises:
a sending unit, configured to send the signal through a light-emitting diode (LED) light source on a camera.

14. A signal transmission system, comprising a transmission apparatus as claimed in claim 13, and further comprising:
a processing component, configured to receive the signal via a light receiving device, and demodulate the signal; and
a carrying component, configured to carry the demodulated signal on a power line carrier for transmission via a coupling transmission device.

15. A signal transmission system, comprising a transmission apparatus as claimed in claim 12, and further comprising:
a processing component, configured to receive the signal via a light receiving device, and demodulate the signal; and
a carrying component, configured to carry the demodulated signal on a power line carrier for transmission via a coupling transmission device.

* * * * *